(12) United States Patent
Huggins et al.

(10) Patent No.: US 8,912,290 B2
(45) Date of Patent: Dec. 16, 2014

(54) PROCESS FOR PRODUCING FUNCTIONAL SILOXANES OF CONTROLLED STRUCTURE

(71) Applicant: Momentive Performance Materials GmbH, Leverkusen (DE)

(72) Inventors: John M. Huggins, Leverkusen (DE); Hubertus Eversheim, Wermelskirchen (DE)

(73) Assignee: Momentive Performance Materials GmbH, Leverkusen (DE)

( * ) Notice: Subject to any disclaimer, the term of this patent is extended or adjusted under 35 U.S.C. 154(b) by 0 days.

(21) Appl. No.: 13/859,149

(22) Filed: Apr. 9, 2013

(65) Prior Publication Data

US 2013/0267665 A1  Oct. 10, 2013

Related U.S. Application Data

(60) Provisional application No. 61/622,144, filed on Apr. 10, 2012, provisional application No. 61/739,935, filed on Dec. 20, 2012.

(51) Int. Cl.
| | | |
|---|---|---|
| C08G 77/04 | (2006.01) | |
| C08G 77/08 | (2006.01) | |
| C08G 77/42 | (2006.01) | |
| C08G 77/06 | (2006.01) | |
| C08G 77/448 | (2006.01) | |
| C08G 64/18 | (2006.01) | |
| C08G 77/16 | (2006.01) | |
| C08G 77/52 | (2006.01) | |

(52) U.S. Cl.
CPC .............. *C08G 77/04* (2013.01); *C08G 77/16* (2013.01); *C08G 77/52* (2013.01); *C08G 77/448* (2013.01); *C08G 77/06* (2013.01); *C08G 64/186* (2013.01); *C08G 77/08* (2013.01); *C08G 77/42* (2013.01)
USPC ........... 525/446; 556/443; 525/464; 525/535; 525/471

(58) Field of Classification Search
CPC ........ C08G 77/04; C08G 77/06; C08G 77/08; C08G 77/42
See application file for complete search history.

(56) References Cited

U.S. PATENT DOCUMENTS

| | | | | |
|---|---|---|---|---|
| 2,885,384 | A * | 5/1959 | Sterman | 528/29 |
| 3,189,662 | A | 6/1965 | Vaughn, Jr. | |
| 3,539,657 | A * | 11/1970 | Merriam et al. | 525/534 |
| 3,976,676 | A * | 8/1976 | Lohse et al. | 556/449 |
| 3,981,898 | A * | 9/1976 | Lohse et al. | 556/449 |
| 4,022,753 | A * | 5/1977 | Lohse et al. | 525/480 |
| 4,501,872 | A * | 2/1985 | Chang et al. | 528/18 |
| 4,584,360 | A | 4/1986 | Paul et al. | |
| 4,732,949 | A | 3/1988 | Paul et al. | |
| 4,814,392 | A * | 3/1989 | Shea et al. | 525/391 |
| 5,109,076 | A | 4/1992 | Freitag et al. | |
| 5,112,925 | A * | 5/1992 | Horlacher et al. | 525/474 |
| 5,227,449 | A | 7/1993 | Odell et al. | |
| 5,340,905 | A | 8/1994 | Kühling et al. | |
| 5,385,984 | A * | 1/1995 | Blohm et al. | 525/393 |
| 5,504,177 | A | 4/1996 | King, Jr. et al. | |
| 5,783,651 | A | 7/1998 | König et al. | |
| 5,821,321 | A | 10/1998 | Archey et al. | |
| 6,066,700 | A | 5/2000 | König et al. | |
| 6,258,968 | B1 | 7/2001 | Eversheim et al. | |
| 7,695,815 | B2 * | 4/2010 | Agarwal et al. | 428/412 |
| 2008/0081893 | A1 | 4/2008 | Hoover et al. | |

* cited by examiner

*Primary Examiner* — Robert S Loewe

(74) *Attorney, Agent, or Firm* — Dominick G. Vicari; Joseph S. Ostroff

(57) ABSTRACT

Disclosed herein is a process for preparing a linear hydroxyaryloxy-functional polydiorganosiloxanes having controlled structures. The process includes the step of reacting a linear α,ω-bisacyloxypolydiorganosiloxane with at least one bisphenolic compound, or hydroxy-functional oligomer thereof, in such a molar ratio that the phenolic groups in the bisphenolic compound or the hydroxy-functional oligomer thereof to the acyloxy groups in the α,ω-bisacyloxy-polydiorganosiloxane is less than 2.0. Also disclosed are hydroxyaryloxy-functional polydiorganosiloxanes produced from the process and the polysiloxane/polyorgano block copolymers made using the hydroxyaryloxy-functional siloxanes.

15 Claims, No Drawings

PROCESS FOR PRODUCING FUNCTIONAL SILOXANES OF CONTROLLED STRUCTURE

CROSS-REFERENCE TO RELATED APPLICATIONS

This application claims priority to U.S. Provisional Application No. 61/622,144 filed Apr. 10, 2012 and U.S. Provisional Application No. 61/739,935 filed Dec. 20, 2012, both of which applications are herein incorporated by reference in their entireties.

FIELD OF THE INVENTION

The present invention relates to linear hydroxyaryloxy-functional polydiorganosiloxanes having controlled structures and the processes of making the same. The present invention also relates to polydiorganosiloxane/polyorgano block copolymers made from the linear hydroxyaryloxy-functional polydiorganosiloxanes and the processes of making the block copolymers.

BACKGROUND OF THE INVENTION

Linear hydroxyaryloxy-functional siloxanes are useful starting materials for making polydiorganosiloxane/polyorgano block copolymers. There are three general pathways known to prepare linear hydroxyaryloxy-functional siloxanes.

U.S. Pat. No. 3,189,662 describes the reaction of chloro-terminated polysiloxanes with bisphenolic compounds, eliminating hydrochloric acid as the byproduct. This process has the disadvantages of requiring the use of large amounts of a basic compound to neutralize the hydrochloric acid byproduct and a tedious filtration of the resulting salt.

U.S. Pat. Nos. 4,584,360 and 4,732,949 describe the reaction of bisphenolic compounds with α,ω-bisacyloxypolydimethylsiloxanes, which are represented by a structural formula of HO—Ar—O—(SiR$_2$—O)$_o$—(SiR$_2$—O)$_p$—(SiR$^1_2$—O)$_q$—Ar—OH, where Ar are arylene radicals from diphenols, R and R$^1$ are alkyl or aryl and o+p+q is from 5 to 100, in a molar ratio of 2:1 to 20:1 in an inert organic solvent using at least one inorganic base in at least stoichiometric amounts. According to the '360 and the '949 patents, the preferred inorganic bases are alkali metal and alkaline earth metal carbonates.

In order to dissolve the large excess of bisphenolic compounds used, the process disclosed in the '360 and the '949 patents requires the use of large amounts of organic solvents, typically chlorinated organic solvents. Use of these chlorinated organic solvents in large amounts is not desirable for health, safety and environmental concerns. And removal of the large amounts of solvents by distillation increases manufacturing costs. Furthermore, the base used in the reaction mixture forms salts, which are difficult to be completely removed from the hydroxyaryloxy-terminated siloxane product by filtration. Thus, isolation of hydroxyaryloxy-terminated siloxanes according to this process in a pure form which is free of undesirable impurities is tedious and costly.

U.S. Pat. No. 6,258,968 describes the reaction of bisphenolic compounds with cyclodialkylsiloxanes in a solvent, whereby an acid catalyst is used and the byproduct water is removed from the reaction mixture by distillation. This process has a number of disadvantages. Firstly, the process is limited to simple monocyclic bisphenols, such as hydroquinone, as bicyclic bisphenols such as bisphenol-A decompose under acid catalysis, forming numerous undesired side-products. Secondly, it is difficult to control the structure of the hydroxyaryloxy-functional polysiloxane products prepared by this process, given that the molecular weight of the product is determined by the exact amount of water removed and the reactivity of the bisphenol. Removal of too little water leads to incomplete reaction and the formation of undesired terminal Si—OH groups, whereby removal of too much water yields polymers of excessively high molecular weight and viscosity. It has been found extremely difficult to obtain polymers free of terminal Si—OH groups that are of sufficiently low viscosity for easy filtration. Filtration of high viscosity polymers without applying heat is slow and tedious, adding significantly to the cost of such processes. Thirdly, the salts formed after neutralization of the acid catalyst have been found to be extremely difficult to remove by filtration, especially if there is unreacted bisphenol in the mixture.

Hydroxyaryloxy-terminated siloxanes can be used to prepare polydiorganosiloxane/polycarbonate block copolymers via a two-phase boundary process or a solventless polycondensation, transesterification, or melt process. Since the solventless polycondensation, transesterification, or melt process does not allow for a subsequent purification step, it is particularly sensitive to impurities. Residual byproducts and impurities that cannot be removed from the hydroxyaryloxy-terminated siloxanes, such as neutralization salts, can be detrimental to the properties of the resulting block copolymers. For example, such impurities can cause haziness and surface defects in molded parts, and reduce the stability towards hydrolysis and chemicals.

Heretofore, it is not believed to be possible to prepare hydroxyaryloxy-functional siloxanes of controlled structure and free of undesired Si—OH and other side products by the prior art processes discussed above in a reproducible and cost effective manner. Furthermore, the hydroxyaryloxy-functional siloxanes prepared by the prior art processes discussed above are typically contaminated by residual neutralization salts and excess bisphenolic compounds. These hydroxyaryloxy-functional polydiorganosiloxanes, when used to prepare polydiorganosiloxane/polyorgano block copolymers by solventless polycondensation, transesterification, or melt processes, may cause haziness or impair the thermal and chemical stability of the copolymer product.

Accordingly there is a need for a cost effective process for the preparation of linear hydroxyaryloxy-terminated polydialkylsiloxanes having controlled structure that are free of unwanted impurities.

SUMMARY OF THE INVENTION

In one aspect, the present invention provides a linear hydroxyaryloxy-functional polydiorganosiloxane of the general Formula (I)

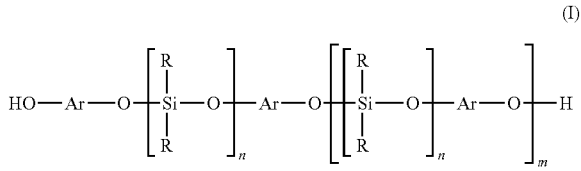

wherein Ar is a divalent C6 to C30 aryl, alkylaryl or aryloxy group, each occurrence of R is independently a monovalent C1 to C20 alkyl, alkylaryl, or aryl group, n has an average value of from 10 to 400, and m has an average value of from 1.0 to 5.0.

In another aspect, the present invention relates to a process to prepare the linear hydroxyaryloxy-functional polydiorganosiloxane of the general Formula (I). The process includes the step of reacting a linear α,ω-bisacyloxypolyorganosiloxane of the general Formula (II) with at least one bisphenolic compound, or a hydroxy-functional oligomer thereof, in such a molar ratio that the phenolic groups in the bisphenolic compound or the hydroxy-functional oligomer thereof to the acyloxy groups in the α,ω-bisacyloxypolydiorganosiloxane is less than 2.0, wherein the general Formula (II) is

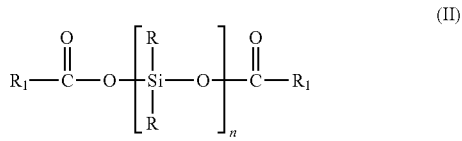

(II)

wherein each occurrence of R and $R_1$ is independently a monovalent C1 to C20 alkyl, alkylaryl, or aryl group, and n has an average value of from 10 to 400.

In yet another aspect, the present invention relates to a polydiorganosiloxane/polyorgano $(A-B)_x$ block copolymer comprising (i) polydiorganosiloxane blocks A and (ii) polycarbonate, polysulfone, polyether ether ketone, and/or polyester blocks B with from 2 to 500 bisoxyorgano groups, wherein the polydiorganosiloxane blocks A are represented by the general Formula (III)

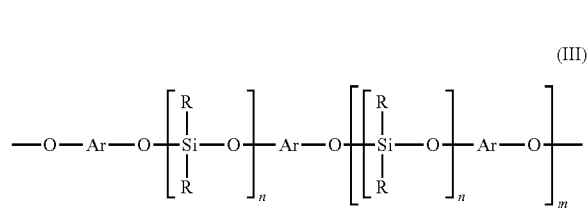

(III)

wherein Ar is a divalent C6 to C30 aryl, alkylaryl or aryloxy group, each occurrence of R is independently a monovalent C1 to C20 alkyl, alkylaryl, or aryl group, n has an average value of from 10 to 400, and m has an average value of from 1.0 to 5.0, and wherein x is between 1 and 1000.

In still another aspect, the present invention relates to a process to prepare the polydiorganosiloxane/polyorgano $(A-B)_x$ block copolymers. The process includes the step of reacting a linear hydroxyaryloxy-functional polydialkylsiloxane of the general Formula (I) with a bisphenolic compound or its polycarbonate, polyester, polyether ether ketone, or polysulfone oligomers under the conditions of either a two-phase boundary polycondensation process or a solventless polycondensation, transesterification, or melt process.

These and other aspects will become apparent upon reading the detailed description of the invention.

DETAILED DESCRIPTION OF THE INVENTION

It was surprisingly found that using less than stoichiometric amounts of bisphenolic compounds and specific reaction conditions, hydroxyaryloxy-terminated polydiorganosiloxanes of controlled structures can be obtained. These siloxanes exhibit particularly advantageous properties for the preparation of polydiorganosiloxane/polyorgano block copolymers because they are low in impurities that may cause haze or impair the thermal and chemical stability of the copolymers. In particular, the process to prepare hydroxyaryloxy-terminated siloxanes according to the invention is highly cost effective and the product produced is particularly suitable to be incorporated into polysiloxane/polyorgano block copolymers via solventless polycondensation, transesterification, or melt processes.

In one embodiment, the present invention provides linear hydroxyaryloxy-terminated polydiorganosiloxanes of the general Formula (I)

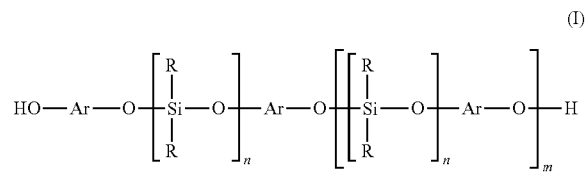

(I)

wherein Ar is a divalent C6 to C30 aryl, alkylaryl or aryloxy group, each occurrence of R is independently a monovalent C1 to C20 alkyl, alkylaryl, or aryl group, n has an average value of 10 to 400, and m has an average value of from 1.0 to 5.0.

In some embodiments, the linear hydroxyaryloxy-functional polydiorganosiloxanes of the general Formula (I) are those represented by the general Formulae (IV) and (V) below:

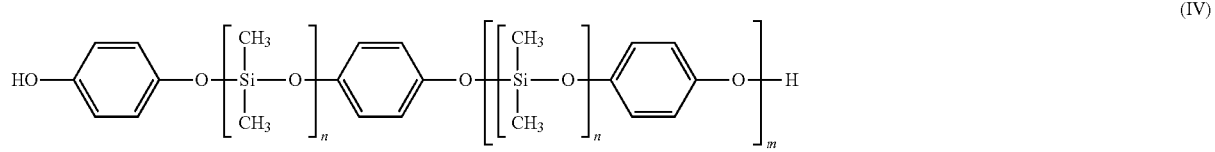

(IV)

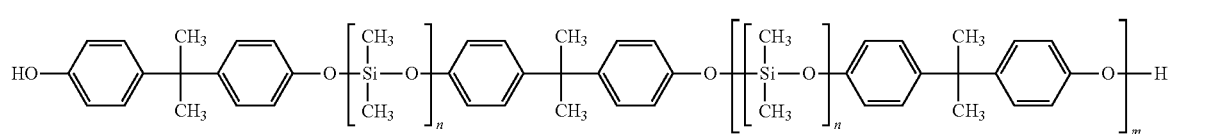

(V)

wherein n has an average value of 10 to 400, specifically 10 to 100 and more specifically 15 to 50, m has an average value between 1.0 and 5.0, more specifically between 2.3 and 4.9, and the value of n times (m+1) is between 20 and 200.

The hydroxyaryloxy-terminated polydiorganosiloxanes of the general Formula (I) can be prepared by a process including the step of reacting a linear α,ω-bisacyloxypolydialkyl-siloxane of the general Formula (II) with at least one bisphenolic compound, or a hydroxy-functional oligomer thereof, in such a molar ratio that the phenolic groups in the bisphenolic compound or the hydroxy-functional oligomer thereof to the acyloxy groups in the α,ω-bisacyloxypolydialkylsiloxane is less than 2.0, wherein the general Formula (II) is

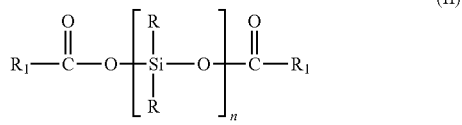

wherein each occurrence of R and R₁ is independently a monovalent C1 to C20 alkyl, alkylaryl, or aryl group, and n has an average value of from 10 to 400.

In connection with Formulae (I) and (II), advantageously n has an average value of 10 to 400, specifically 10 to 100 and most specifically 15 to 50; m has an average value of greater than or equal to 1.0, specifically between 1.0 and 5.0, more specifically between 2.3 and 4.9; the value of n times (m+1) is between 20 and 500, advantageously between 20 and 200; R and R₁ are independently phenyl or C1 to C20 alkyl, specifically C1 to C10 alkyl, more specifically C1 to C5 alkyl such as methyl, ethyl, propyl, butyl and pentyl, most specifically R and R₁ are either methyl or phenyl; and Ar is at least one of the following structures:

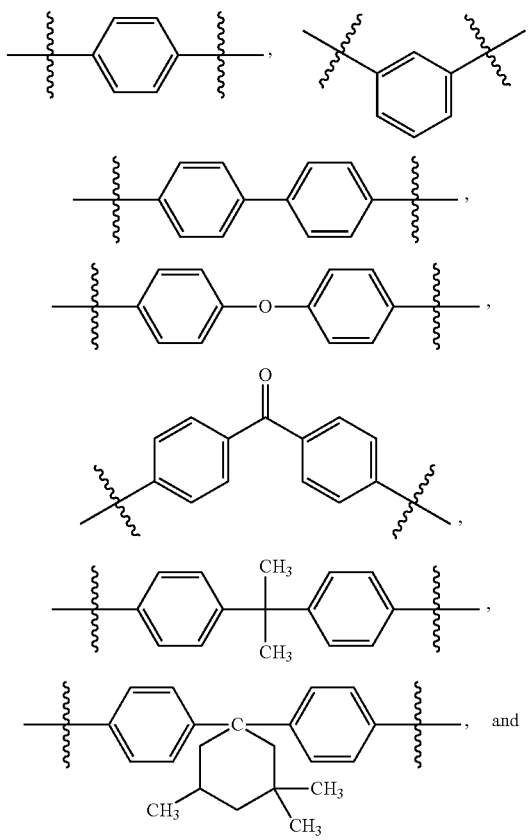

and

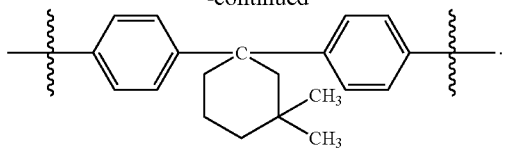

This reaction is advantageously performed in an inert solvent capable of dissolving at least in part the bisphenolic compound or the oligomer thereof. Preferred solvents are aromatic hydrocarbons such as toluene, xylenes, chlorobenzene and the like. Especially preferred inert solvents are polar organic acids, such as acetic acid and other volatile C3 to C6 organic carboxylic acids, or the like. It is particularly advantageous to add the linear α,ω-bisacyloxypolydiorganosiloxane of the general Formula (II) to a solution of the bisphenolic compound in an organic carboxylic acid such as a C2 to C6 carboxylic acid, for example acetic acid, either alone or together with other inert solvents, at a temperature sufficient to dissolve a significant portion of the bisphenolic compound. Other methods of addition are also possible.

The reaction of linear α,ω-bisacyloxypolydiorganosiloxanes of the general Formula (II) with bisphenolic compounds, or hydroxy-functional oligomers of the same, can be accelerated by the use of optional catalysts. Advantageously, the catalysts are the metal salts of organic acids, such as a sodium or potassium acetate. Other catalysts known in the art to catalyze siloxane condensation reactions can also be used.

The linear hydroxyaryloxy-functional polydiorganosiloxanes of the general formula (I) can be used to make polydiorganosiloxane/polyorgano block copolymers.

Accordingly, in another embodiment, the present invention provides a process for the preparation of polydiorganosiloxane/polyorgano (A-B)$_x$ block copolymers according to the two-phase boundary polycondensation process. The two-phase boundary polycondensation process is generally known and has been described in U.S. Pat. Nos. 3,189,662, 4,584,360 and 4,732,949, all of which are incorporated herein by references in their entireties. According to the two-phase boundary polycondensation process of the invention, a bisphenolic compound or the polycarbonate, polyester, polyether ketone or polysulfone oligomers thereof and a linear hydroxyaryloxy-functional polydiorganosiloxane of general Formula (I) dissolved in an organic solvent, such a methylene chloride or chlorobenzene, react with a carbonate donor in the presence of an aqueous solution of an inorganic base and an optional catalyst. In one embodiment, the carbonate donor is phosgene. Chain terminating agents, such as monophenols, can optionally be used in the reaction.

The linear hydroxyaryloxy-functional polydiorganosiloxanes of the general formula (I) are particularly suited for the preparation of polydiorganosiloxane/polyorgano block copolymers according to solventless polycondensation, transesterification, or melt processes. In particular the polysiloxanes of the general Formula (I) exhibit very low levels of undesired impurities.

Accordingly, in another embodiment, the present invention provides a solventless polycondensation, transesterification, or melt process to prepare the polydiorganosiloxane/polyorgano block copolymers. The solventless polycondensation, transesterification, or melt process is generally known and have been described in U.S. Pat. Nos. 5,504,177, 5,340,905, 5,227,449, 5,783,651, 5,821,321 and 6,066,700, all of which are incorporated herein by reference in their entireties. The solventless polycondensensation and/or transesterification processes of the invention include the step of reacting hydroxyaryloxy-functional siloxanes of the general Formula (I) and bisphenolic compounds or their polycarbonate, polyester, polyether ether ketone or polysulfone oligomers in absence of added solvents followed by removal of byproducts by distillation, whereby condensation of the terminal hydroxyaryl groups on the polysiloxane with the hydroxy, ester or carbonate groups of the bisphenolic compounds or their oligomers leads to the formation of new linkages between the block segments. This process may include the use of a carbonate donor such as diphenylcarbonate, chain terminating agents, such as phenol or C6 to C12-alkylphenols described in U.S. Pat. No. 4,732,949, condensation linkage groups, such as the diarylcarbonate or oligocarbonates as described in U.S. Pat. No. 5,504,177 and U.S. Pat. No. 5,783,651, and catalysts known in the art.

Particularly preferred is the preparation of the block copolymers from linear hydroxyaryloxy-functional polydiorganosiloxanes of the general Formula (I) and polycarbonate oligomers of bisphenolic compounds in the solventless polycondensation, transesterification, or melt process, using chain terminating groups, and optional diarylcarbonates or oligocarbonates, to control the molecular weight of the resulting copolymer and catalysts to promote the reaction. In one embodiment, suitable catalysts are quaternary ammonium or quaternary phosphonium catalysts as known in the art. Advantageously, the solventless polycondensation, transesterification, or melt process is conducted at temperatures between 160 and 320° C. employing a vacuum to assist in removal of byproducts.

In an additional aspect of the current invention, condensation of the polydiorganoslioxanes of the general Formula (I) with polycarbonate oligomers can also include co-condensation with mono or diester compounds or polyester oligomers to form polydialkylsiloxane/polyester/polycarbonate triblock copolymers.

The bisphenolic compounds or their oligomers suitable for use in the processes to prepare the hydroxyaryloxy-functional polydiorganosiloxane of the general Formula (I) and the copolymer (A-B)$_x$ are bisphenolic compounds described in U.S. Pat. Nos. 4,732,949 and 5,109,076 or their oligomers, wherein the contents of the '949 and the '076 patents are incorporated herein by references in their entireties. In one embodiment, suitable bisphenolic compounds or the oligomers thereof are those of the following structures:

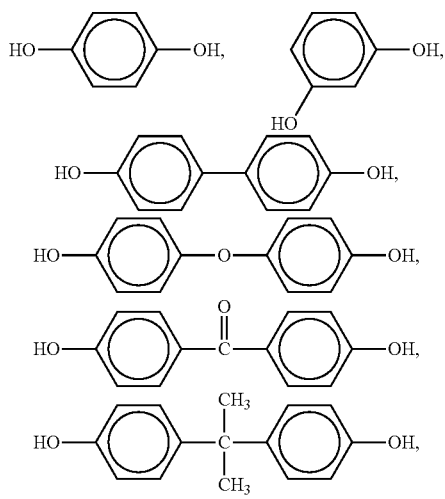

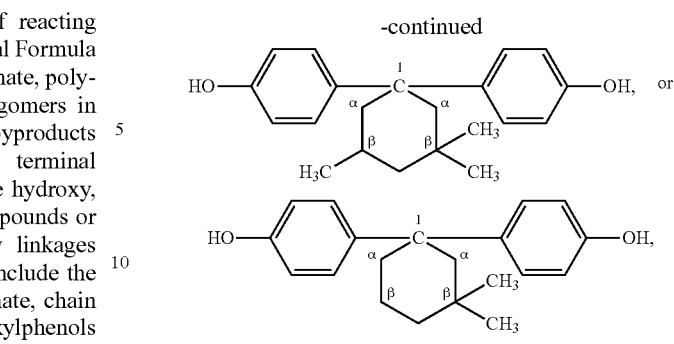

and their polycarbonate, polysulfone and polyester oligomers. Advantageously, at least 90% of the bisoxyaryl groups in the polycarbarbonate oligomers are derived from the preferred bisphenolic compounds described above and at least 50% of the terminal groups are phenolic.

Advantageously, the oligomers are the polycarbonate oligomers of the bisphenolic compounds described above. They are represented by the general Formula (VI)

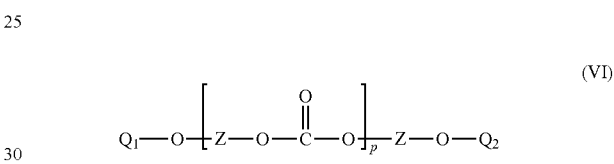

wherein Z is a divalent C6 to C30 aryl, bisarylalkyl or bisaryloxy group, p is a number between 2 and 500, preferably between 2 and 150. In the preparation of the hydroxyaryloxy-functional polydiorganosiloxane of the general Formula (I), the oligomer (VI) is advantageously hydroxy-functional whereby $Q_1$ and $Q_2$ are hydrogen. In preparation of polydialkylsiloxane/polyorgano (A-B)x block copolymers under the conditions of a two-phase boundary polycondensation process together with phosgene, advantageously, $Q_1$ and $Q_2$ are independent of one another either hydrogen or a —C(=O)—X group and X is a halogen, hydroxy, C1-C20 alkyloxy, alkylaryloxy, or aryloxy group. In preparation of polydialkylsiloxane/polyorgano (A-B)x block copolymers according to solventless polycondensation, transesterification or melt processes, advantageously $Q_1$ and $Q_2$ are independent of one another either hydrogen or a —C(=O)—X group and X is a hydroxy, C1-C20 alkyloxy, alkylaryloxy, or aryloxy group.

Advantageously, the oligomers are the polyester oligomers represented by the general Formula (VII)

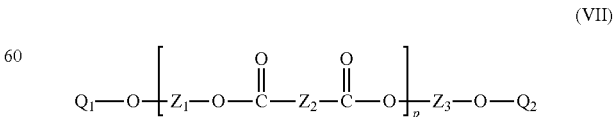

whereby $Z_1$, $Z_2$ and $Z_3$ are independently a divalent C6 to C30 aryl, bisarylalkyl or bisaryloxy group, and Q1, Q2 and p are as defined herein above in the context of Formula (VI).

Advantageously, the oligomers are the polysulfone oligomers represented by of the general Formula (VIII)

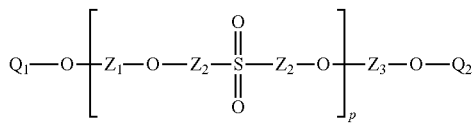

(VIII)

wherein $Z_1$, $Z_2$ and $Z_3$ are independently divalent C6 to C30 aryl, bisarylalkyl or bisaryloxy groups, and Q1, Q2 and p are as defined herein above in the context of Formula (VI).

Advantageously, the oligomers are the polyether ether ketone oligomers represented by of the general Formula (IX)

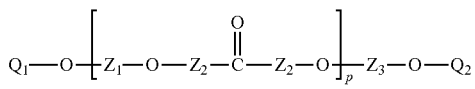

(IX)

wherein $Z_1$, $Z_2$ and $Z_3$ are independently divalent C6 to C30 aryl, bisarylalkyl or bisaryloxy groups, and Q1, Q2 and p are as defined herein above in the context of Formula (VI).

The polydialkylsiloxane/polyorgano block copolymers produced by the above processes are (A-B)x block copolymers. Advantageously the block copolymers comprise polydiorganosiloxane blocks (A) represented by the general Formula (III)

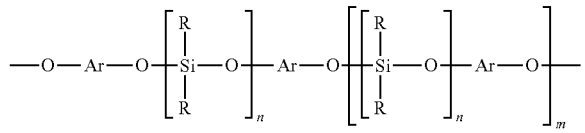

(III)

and polycarbonate blocks (B) of the general structure (X)

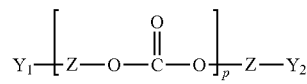

(X)

or polyester blocks (B) of the general structure (XI)

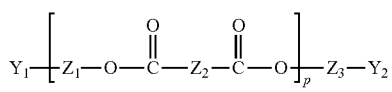

(XI)

or polysulfone blocks (B) of the general structure (XII)

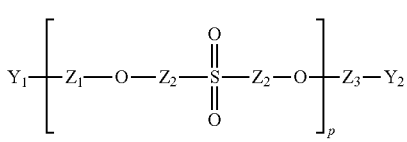

(XII)

or polyether ether ketone blocks (B) of the general structure (XIII)

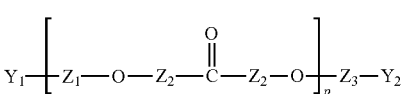

(XIII)

wherein Ar is a divalent C6 to C30 aryl, alkylaryl or aryloxy group, each occurrence of R is independently a monovalent C1 to C20 alkyl, alkylaryl, or aryl group, n is between 10 and 400, advantageously between 10 and 100 and more advantageously between 15 and 50, m is between 1.0 and 5.0, advantageously between 2.3 and 4.9, the value of n times (m+1) is between 20 and 500, advantageously between 20 and 200, each of Z, $Z_1$, $Z_2$ and $Z_3$ is independently a divalent C6 to C30 aryl, bisarylalkyl or bisaryloxy group, p is a number between 2 and 500, $Y_1$ and $Y_2$ are either a direct linkage or carbonate or ester linkage groups, and x is between 1 and 1000.

Advantageously, in the polydiorganosiloxane/polyorgano (A-B)x block copolymer of the present invention at least 90% of the diorganosiloxane blocks (A) are polydimethylsiloxanes, and the copolymer blocks (B) are at least 90% polycarbonate blocks prepared from the preferred bisphenolic compounds described above.

The polydiorganosiloxane/polyorgano block copolymers of the present invention can be prepared at low cost and in good yields with very low levels of interfering impurities, in particular inorganic salts. In addition, the polydiorganosiloxane/polyorgano block copolymers of the present invention exhibit improved control of the block domain structure in molded articles. This leads to improved and reproducible physical properties such as low temperature impact resistance as well as hydrolysis and chemical resistance. The polydiorganosiloxane/polyorgano block copolymers of the invention also exhibit better surface tension properties that can lead to improved mold flow and chemical resistance properties as compared with the block copolymers prepared by the prior art processes.

The following examples are intended to illustrate, but in no way limit the scope of the present invention. All percentages are by weight based on the total weight of the composition and all temperatures are in degrees Celsius unless explicitly stated otherwise.

EXAMPLES

Example 1

In a reaction flask equipped with a thermostat heater, stirrer, thermometer, and reflux condenser, 250 g of an α,ω-bisacyloxypolydimethylsiloxane, with an average chain length of 31.8 dimethylsiloxy units as determined by $^{29}$Si NMR and 230 mmoles of acyloxy terminal groups, was added dropwise over 4 hours to a solution of 35.1 g (150 mmoles) bisphenol-A in 50 g xylenes, 25 g acetic acid and 0.5 g of sodium acetate, while heating to a mild reflux at 105° C. After complete addition the clear solution was stirred for an additional hour. Then the solvents and volatiles were removed by vacuum distillation to 160° C. and 3 mbar pressure. After cooling the crude product was easily filtered over a 3 micron filter (Seitz K300) to give 236 g (83% theory) of a clear, colorless liquid, which had the following structure and characteristics:

Structure:

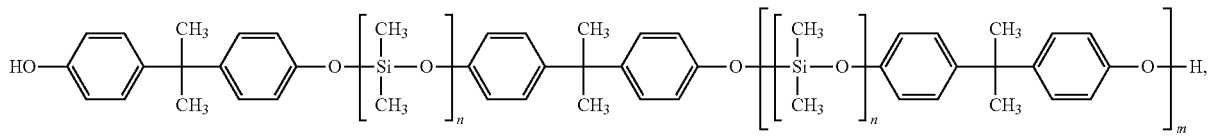

NMR (found): n=33.5; m=2.3;
Viscosity (23° C.): 611 mPa·s;
% solids (160° C., 30 min): 99.4%;
nD23=1.4274; and
Hydroxy content: 13.3 mg KOH/g.

Example 2

In a reaction flask as in example 1, 180 g of an α,ω-bisacyloxypolydimethylsiloxane, with an average chain length of 20.5 dimethylsiloxy units as determined by $^{29}$Si NMR and 221 mmoles of acyloxy terminal groups, was added dropwise over 3 hours to a solution of 15.8 g (144 mmoles) hydroquinone in 72 g xylenes, 36 g acetic acid and 0.36 g of sodium acetate, while heating to a mild reflux at 110° C. After complete addition the clear solution was stirred for an additional hour. Then the solvents and volatiles were removed by vacuum distillation to 150° C. and 3 mbar pressure. After cooling the crude product was easily filtered over a 3 micron filter (Seitz K300) to give 165 g (84% theory) of a clear, colorless liquid, which had the following structure and characteristics:

Structure:

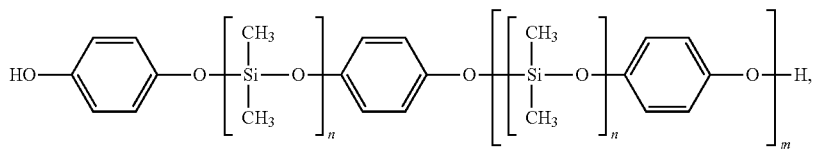

NMR (found): n=20.8; m=4.88;
Viscosity (23° C.): 440 mPa·s;
% solids (160° C., 30 min): 99.45%;
$_nD_{23}$=1.4200; and
Hydroxy content: 12.0 mg KOH/g.

Comparative Example A According to U.S. Pat. No. 4,584,360

In a reaction flask as in example 1, a solution of 109 g of an α,ω-bisacyloxypolydimethylsiloxane, with an average chain length of 31.8 dimethylsiloxy units as determined by $^{29}$Si NMR and 88 mmoles of acyloxy terminal groups, in 60 g of chlorobenzene was added dropwise over 4 hours to a solution of 50 g (214 mmoles) bisphenol-A in 352 g chlorobenzene and 12.2 g (88 mmol) of K$_2$CO$_3$, while heating to a mild reflux. After complete addition the solution was stirred for an additional hour and then filtered while still hot. Upon cooling a significant amount of precipitate formed. Then the solvents and volatiles were removed by vacuum distillation to 160° C. and 3 mbar pressure. The crude product was filtered cold over a 3 micron filter (Seitz K300) to give 82 g of a product in poor yield (66% theory). After standing the liquid product became turbid, precipitating further unreacted bisphenol-A. The product had the following structure and characteristics:

Structure:

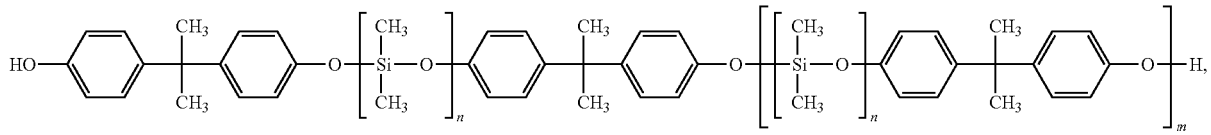

NMR (found): n=33.0; m=0.95;
Viscosity (23° C.): 326 mPa·s;
% solids (160° C., 30 min): 99.37%;
$_nD_{23}$=1.4312; and
Hydroxy content: 22.8 mg KOH/g.

Comparative Example B According to U.S. Pat. No. 6,258,968

In a three-necked reaction flask with a heater, stirrer, thermometer, water separator and reflux condenser, were added 3210 g of octamethylcyclotetrasiloxane, 1200 g of xylenes, 318 g of hydroquinone and 1000 ppm of concentrated sulfuric acid and 500 ppm of a perfluoro alkylsulfonic acid. The mixture was heated to reflux for 3 hours while removing 28 g of water. The reaction mixture was cooled to 60° C. and 10.5 g ammonium carbonate was added and stirred for 1 hour at 60° C. Then the solvents and volatiles were removed by vacuum distillation to 150° C. and 5 mbar pressure. After cooling the crude product could only be filtered over a 3 micron filter (Seitz K300) with difficulty yielding significant amounts of filter cake and a clear liquid product in poor yield, which upon standing precipitated additional unreacted hydroquinone and salts. A second filtration over a 3 micron filter (Seitz K300) gave a colorless liquid, which had the following structure and characteristics:

Structure:

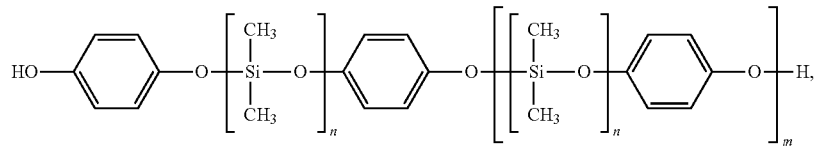

NMR (found): n=29.2; m=9.0;
Viscosity (23° C.): 2320 mPa·s;
% solids (160° C., 30 min): 96.9%;
$_nD_{23}$=1.416; and
Hydroxy content: 6.5 mg KOH/g.

Comparative Example C According to U.S. Pat. No. 6,258,968

In a reaction flask as in comparative example B were added 350 g of octamethylcyclotetrasiloxane, 300 g of toluene, 74.5 g of bisphenol-A and 1000 ppm of concentrated sulfuric acid and 500 ppm of a perfluoro alkylsulfonic acid. The mixture was heated to reflux for 5 hours while removing 3.8 g of water. The reaction mixture was cooled to 60° C. and 12 g sodium carbonate was added and stirred for 1 hour at 60° C. Then the solvents and volatiles were removed by vacuum distillation to 155° C. and 1 mbar pressure. After cooling the crude product could only be filtered over a 3 micron filter (Seitz K300) with difficulty yielding significant amounts of filter cake and a yellow, turbid product in low yield, which upon standing precipitated additional byproducts and salts. NMR analysis of the product confirmed formation of large amounts of undesirable byproducts from decomposition of bisphenol-A.

While the invention has been described above with reference to specific embodiments thereof, it is apparent that many changes, modifications and variations can be made without departing from the invention concept disclosed herein. Accordingly, it is intended to embrace all such changes, modifications, and variations that fall within the spirit and broad scope of the appended claims.

What is claimed is:

1. A process for preparing a linear hydroxyaryloxy-functional polydialkylsiloxane of the general Formula (I)

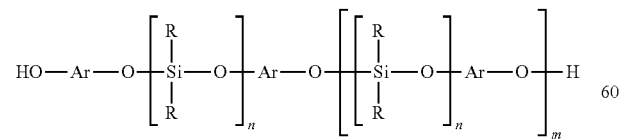

(I)

wherein Ar is a divalent $C_6$ to $C_{30}$ aryl, alkylaryl or aryloxy group or a residue of a bishydroxy-functional oligomer, each occurrence of R is independently a monovalent $C_1$ to $C_{20}$ alkyl, alkylaryl, or aryl group, n has an average value of from 10 to 400, and m has an average value of from 1.0 to 5.0, wherein the process comprises:

reacting a linear α,ω-bisacyloxypolydiorganosiloxane of the general Formula (II) with at least one bisphenolic compound, or a bishydroxy-functional oligomer thereof, in such a molar ratio that the phenolic groups in the bisphenolic compound or the bishydroxy-functional oligomer thereof to the acyloxy groups in the α,ω-bisacyloxypolydialkylsiloxane is less than 2.0, wherein the general Formula (II) is

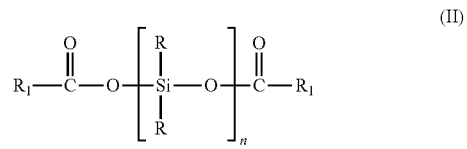

(II)

wherein each occurrence of R and $R_1$ is independently a monovalent $C_1$ to $C_{20}$ alkyl, alkylaryl, or aryl group, and n is between 10 and 400, in a solvent composing at least one organic acid being a $C_2$ to $C_6$ carboxylic acid.

2. The process of claim 1 wherein the linear α,ω-bisacyloxy-polydiorganosiloxane of the general Formula (II) is reacted with the bisphenolic compound, or the hydroxy-functional oligomer thereof in the presence of a catalyst, wherein the catalyst is a metal salt of an organic acid.

3. The process of claim 1 wherein the bisphenolic compound, or hydroxy-functional oligomer thereof, is selected from the group consisting of

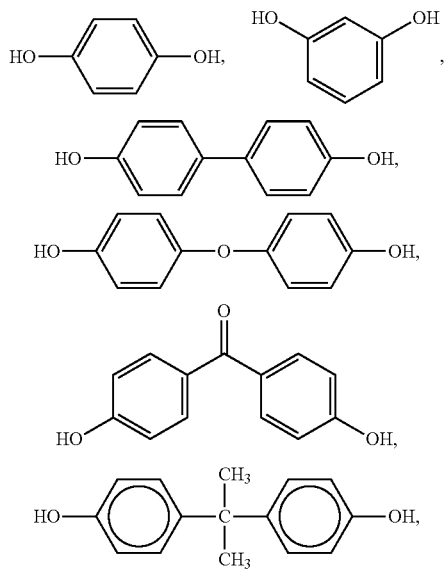

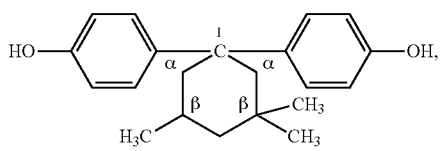

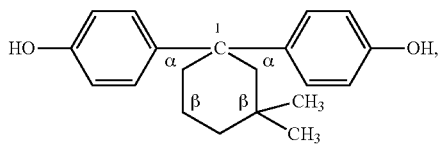

and the corresponding hydroxy-functional polycarbonate, hydroxy-functional polysulfone and hydroxy-functional polyester oligomers thereof.

4. The process of claim 1 wherein the hydroxy-functional oligomer is a hydroxy-functional polycarbonate, a hydroxy-functional polyester, a hydroxy-functional polysulfone oligomer or a hydroxy-functional polyether ether ketone oligomer represented by Formulae (VI), (VII), (VIII) and (IX) respectively:

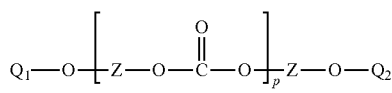

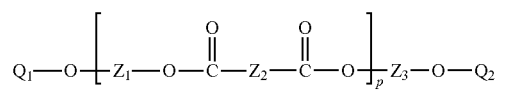

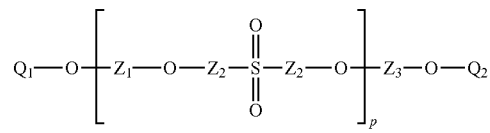

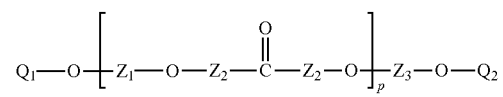

wherein each of Z, $Z_1$, $Z_2$ and $Z_3$ is independently a divalent C6 to C30 aryl, bisarylalkyl or bisaryloxy group, $Q_1$ and $Q_2$ are hydrogen, and p is a number between 2 and 150.

5. The process of claim 1 wherein the step of reacting a linear α,ω-bisacyloxy-polydiorganosiloxane of the general Formula (II) is conducted such there is a molar ratio of the phenolic groups in the bisphenolic compound or the bishydroxy-functional oligomer thereof to the acyloxy groups in the α,ω-bisacyloxypolydialkylsiloxane of from 1.2 to less than 2.0.

6. A polydiorganosiloxane/polyorgano (A-B)$_x$ block copolymer comprising (i) polydiorganosiloxane blocks A and (ii) polycarbonate, polyester, polysulfone and/or polyether ether ketone oligomer blocks B with from 2 to 500 bisoxyorgano groups, wherein the polydialkylsiloxane blocks A are represented by the general Formula (III)

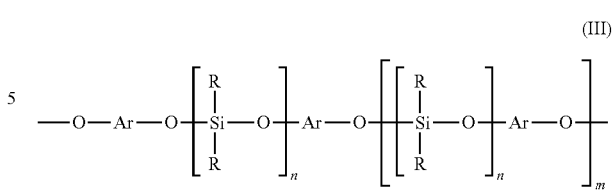

wherein Ar is a divalent C6 to C30 aryl, alkylaryl or aryloxy group, each occurrence of R is independently a monovalent C1 to C20 alkyl, alkylaryl, or aryl group, n has an average value of 10 to 400, and m has an average value of 1.0 to 5.0, and x is between 1 and 1000.

7. The polydiorganosiloxane/polyorgano (A-B)$_x$ block copolymer of claim 6 wherein each occurrence of R is independently a methyl or phenyl group.

8. The polydiorganosiloxane/polyorgano (A-B)$_x$ block copolymer of claim 6 wherein Ar is represented by one of the following structures:

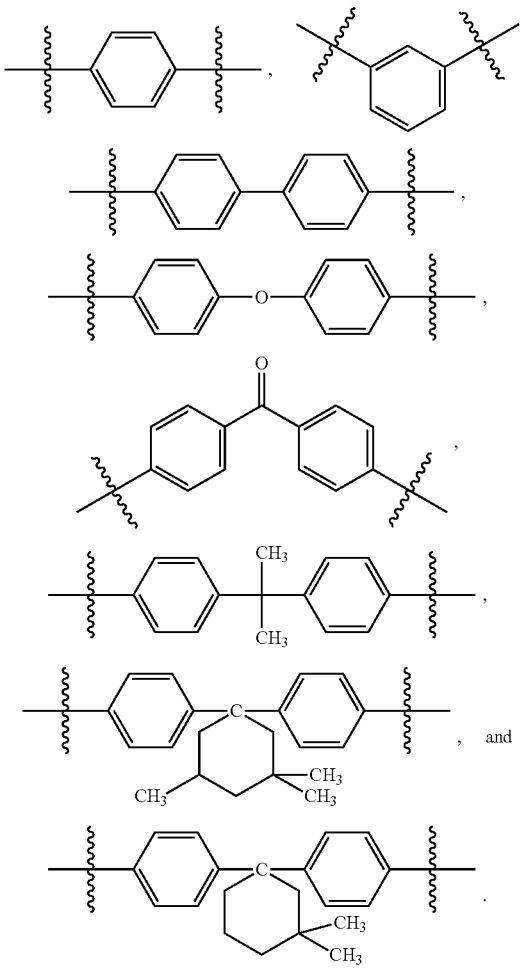

9. The polydiorganosiloxane/polyorgano (A-B)$_x$ block copolymer of claim 6 wherein the blocks B are represented by the general Formula (X), (XI), (XII), or (XIII):

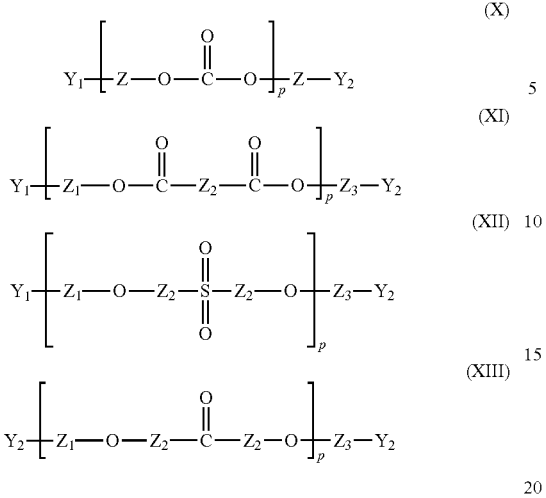

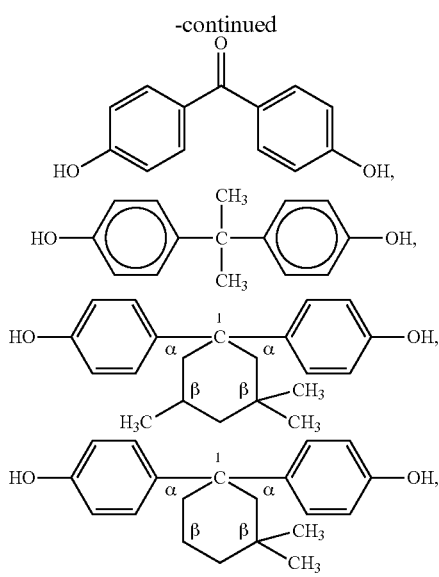

wherein each of Z, $Z_1$, $Z_2$ and $Z_3$ is independently a divalent C6 to C30 aryl, bisarylalkyl or bisaryloxy group, p is a number between 2 and 500, and $Y_1$ and $Y_2$ are either a direct linkage or carbonate or ester linkage groups.

10. A process for the preparation of a polydialkylsiloxane/polyorgano $(A-B)_x$ block copolymer of claim 6 wherein a linear hydroxyaryloxy-functional polydialkylsiloxane of the general formula (I)

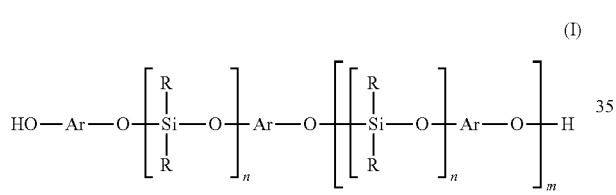

wherein Ar is a divalent C6 to C30 aryl, alkylaryl or aryloxy group, each occurrence of R is independently a monovalent C1 to C20 alkyl, alkylaryl, or aryl group, n has an average value of from 10 to 400, and m has an average value of from 1.0 to 5.0; a bisphenolic compound or its polycarbonate, polyester or polysulfone oligomers by two-phase boundary polycondensation or solventless polycondensation, transesterification or melt processes.

11. The process of claim 10 wherein the bisphenolic compound, or its polycarbonate, polyester or polysulfone oligomers, is selected from the group consisting of

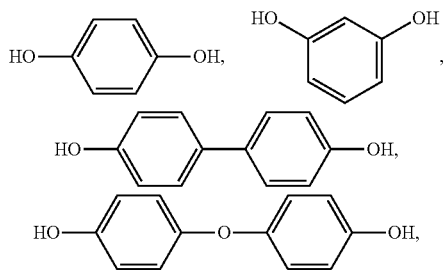

and the corresponding polycarbonate, polysulfone and polyester oligomers thereof.

12. The process of claim 6, wherein the polycarbonate, polyester, polysulfone, and polyether ether ketone oligomer blocks have the general Formula (VI), (VII), (VIII), and (IX), respectively:

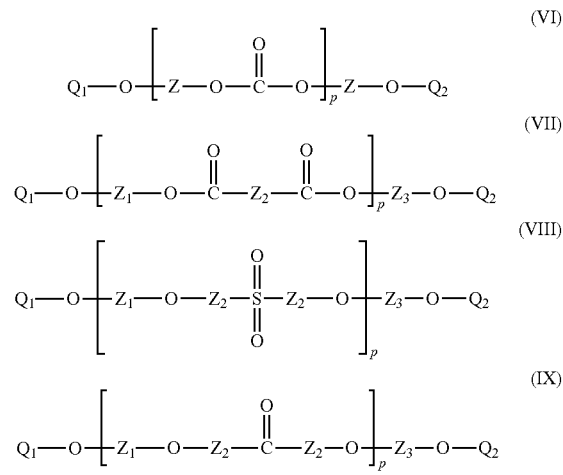

wherein each of Z, $Z_1$, $Z_2$ and $Z_3$ is independently a divalent C6 to C30 aryl, bisarylalkyl or bisaryloxy group, p is a number between 2 and 500, $Q_1$ and $Q_2$ are independent of one another either hydrogen or a —C(=O)—X group wherein X is a halogen, hydroxy, C1-C20 alkyloxy, alkylaryloxy, or aryloxy group.

13. The process of claim 10, wherein chain terminating groups or condensation linkage groups are used to control the molecular weight of the block copolymer $(A-B)_x$.

14. The process of claim 10 wherein the reaction is conducted under the conditions of a solventless polycondensation, transesterification, or melt process.

15. An article of manufacture comprising the block copolymer of claim 6.

* * * * *